(12) United States Patent
Yu et al.

(10) Patent No.: US 10,743,391 B2
(45) Date of Patent: Aug. 11, 2020

(54) LIGHTING CONTROL METHOD AND SYSTEM

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventors: Jianfeng Yu, Zhejiang (CN); Binjie Xu, Zhejiang (CN); Jian Zhang, Zhejiang (CN); Xiaobo You, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/577,471

(22) Filed: Sep. 20, 2019

(65) Prior Publication Data

US 2020/0100343 A1    Mar. 26, 2020

(30) Foreign Application Priority Data

Sep. 21, 2018 (CN) .......................... 2018 1 1104528

(51) Int. Cl.
*H05B 37/02* (2006.01)
*H05B 47/11* (2020.01)

(52) U.S. Cl.
CPC .................... *H05B 47/11* (2020.01)

(58) Field of Classification Search
CPC ............ H05B 37/0218; H05B 37/0227; H05B 37/0272

USPC ................................................. 315/152, 307
See application file for complete search history.

(56) References Cited

U.S. PATENT DOCUMENTS

| | | | |
|---|---|---|---|
| 9,179,522 B2* | 11/2015 | Delnoij ..................... G01J 1/16 |
| 9,854,642 B2* | 12/2017 | Kashani ................. H05B 47/11 |
| 2012/0074852 A1* | 3/2012 | Delnoij .................. H05B 47/11 |
| | | | 315/158 |
| 2012/0326611 A1* | 12/2012 | Nanahara ........... H05B 37/0227 |
| | | | 315/151 |
| 2015/0305119 A1* | 10/2015 | Hidaka .................. H05B 47/11 |
| | | | 315/153 |
| 2016/0029462 A1* | 1/2016 | Koch ................. H05B 37/0254 |
| | | | 315/307 |
| 2017/0339764 A1* | 11/2017 | Nakamura ............. H05B 45/10 |
| 2018/0199415 A1* | 7/2018 | Pandharipande .... H05B 47/105 |

* cited by examiner

*Primary Examiner* — Tung X Le
(74) *Attorney, Agent, or Firm* — Wang Law Firm, Inc.

(57) ABSTRACT

The invention discloses a lighting control method, by setting the first target illumination value of the illumination sensor so that the illumination of the target area is the set illumination value. Later, at each time node, the system calculates the current second target illumination value of the illumination sensor, and then adjusts the brightness of the lamp so that the detected value of the illumination sensor reaches the second target illumination value. When the detected value of the illumination sensor reaches the second target illumination value, the illumination of the target area can be consistent with the set illumination value of the target area at this time. The present invention can make the target area to substantially maintain constant illumination during the illumination period.

7 Claims, 2 Drawing Sheets

LIGHTING CONTROL METHOD AND SYSTEM

RELATED APPLICATION

This application claims priority to a Chinese Patent Application No. CN 201811104528.8, filed on Sep. 21, 2018.

FIELD OF THE TECHNOLOGY

The present invention relates to lighting field, with particular emphasis on a Lighting control method and system.

BACKGROUND OF THE INVENTION

With the rapid development of the business and the government's control over energy, based on the implementation of energy-saving emission reduction and environmental protection policies, the dealers' requirements of the lighting control system are increasing. The existing constant illumination control system on the market is based on the illumination of the sensor location, not the illumination of the target area. It can control the overall illumination level of the space, but cannot control the target area to achieve constant illumination. However, in the application of commercial lighting, there is a new requirement to control the illumination of the working table. The well-known TRIDONIC light sensor based on DALI system in the industry can only control the overall illumination of the space so as to save electricity to a certain extent, but it cannot meet the requirement for controlling working table to achieve constant illumination.

BRIEF SUMMARY OF THE INVENTION

In view of this, it is necessary to provide a lighting control method and system to overcome the above disadvantages.

In the present invention, a lighting control method has been provided for illuminating a target area by lamp and detecting illumination by illumination sensor, wherein the illumination detected by the illumination sensor is the sum of the illumination value of the light from the lamp reflected to the position of the illumination sensor through the target area and the illumination value of the external light illuminating to the position of the illumination sensor, while the illumination of the target area is the sum of the illumination value of the light from the lamp illuminating to the target area and the illumination value of the external light illuminating to the target area, characterized in that the lighting control method comprises the following steps:

step 1, set a plurality of time nodes in the illumination period of the lamp;

step 2, set a first target illumination value of the illumination sensor;

step 3, adjust the brightness of the lamp until the detected value of the illumination sensor is the first target illumination value, and determine whether the illumination of the target area is appropriate at this time; if yes, then the illumination of the target area is the set illumination value at this time, the illumination value of the external light illuminating to the position of the illumination sensor at this time is recorded, and step 4 is performed; if not, go back to step 2;

step 4, when each time node is reached, the current second target illumination value of the illumination sensor is calculated, and the second target illumination value needs to make the current illumination of the target area consistent with the set illumination value of the target area;

step 5, adjust the brightness of lamps to make the detected value of the illumination sensor reach the second target illumination value, and the illumination of the target area is consistent with the set illumination value of the target area at this time.

Advantageously, the current second target illumination value of the illumination sensor is obtained by the following formula when each time node is reached:

$$P_1 = \left(1 - \frac{K_1 K_0}{K_2}\right)(C_1 - C_0) + P_0;$$

Where $K_0$ is the illumination transfer coefficient of the target area to the position of the illumination sensor, $K_1$ is the illumination transfer coefficient of the external environment to the target area, $K_2$ is the illumination transfer coefficient of the external environment to the position of the illumination sensor, $C_1$ is the illumination value of the external light illuminating to the position where the illumination sensor is located at the current time node, $C_0$ is the illumination value of the external light illuminating to the position of the illumination sensor when the detected value of the illumination sensor is the first target illumination value and $P_0$ is the first target illumination value of the illumination sensor.

A lighting control system has also been provided in the present invention, comprising:

illumination sensor that detects light reflected from the target area to the position of the illumination sensor and external light that illuminates the position of the illumination sensor;

setting module, configured to set a first target illumination value of the illumination sensor;

calculation module, configured to calculate a second target illumination value of the illumination sensor when each time node is reached;

dimming module, configured to adjust the brightness of the lamp according to the first target illumination value and the second target illumination value.

Compared with the prior art, the lighting control method and system provided by the present invention adjusts the brightness of the lamp by setting the first target illumination value of the illumination sensor so that the illumination of the target area is the set illumination value. Later, at each time node, the system calculates the current second target illumination value of the illumination sensor, and then adjusts the brightness of the lamp so that the detected value of the illumination sensor reaches the second target illumination value. When the detected value of the illumination sensor reaches the second target illumination value, the illumination of the target area can be consistent with the set illumination value of the target area at this time. In this way, no matter how the external light changes at each time node, the illumination of the target area can be consistent with the set illumination value of the target area by adjusting the illumination of the lamp, which makes the target area keep constant illumination at each time node during the illumination period of the lamp, and also makes the target area basically maintain constant illumination during the illumination period.

BRIEF DESCRIPTION OF THE DRAWINGS

The drawings described herein are intended to promote a further understanding of the present invention, as follows.

DETAILED DESCRIPTION OF THE INVENTION

The present application is illustrated by way of the following detailed description based on of the accompanying drawings. It should be noted that illustration to the embodiment in this application is not intended to limit the invention.

Figure 1:
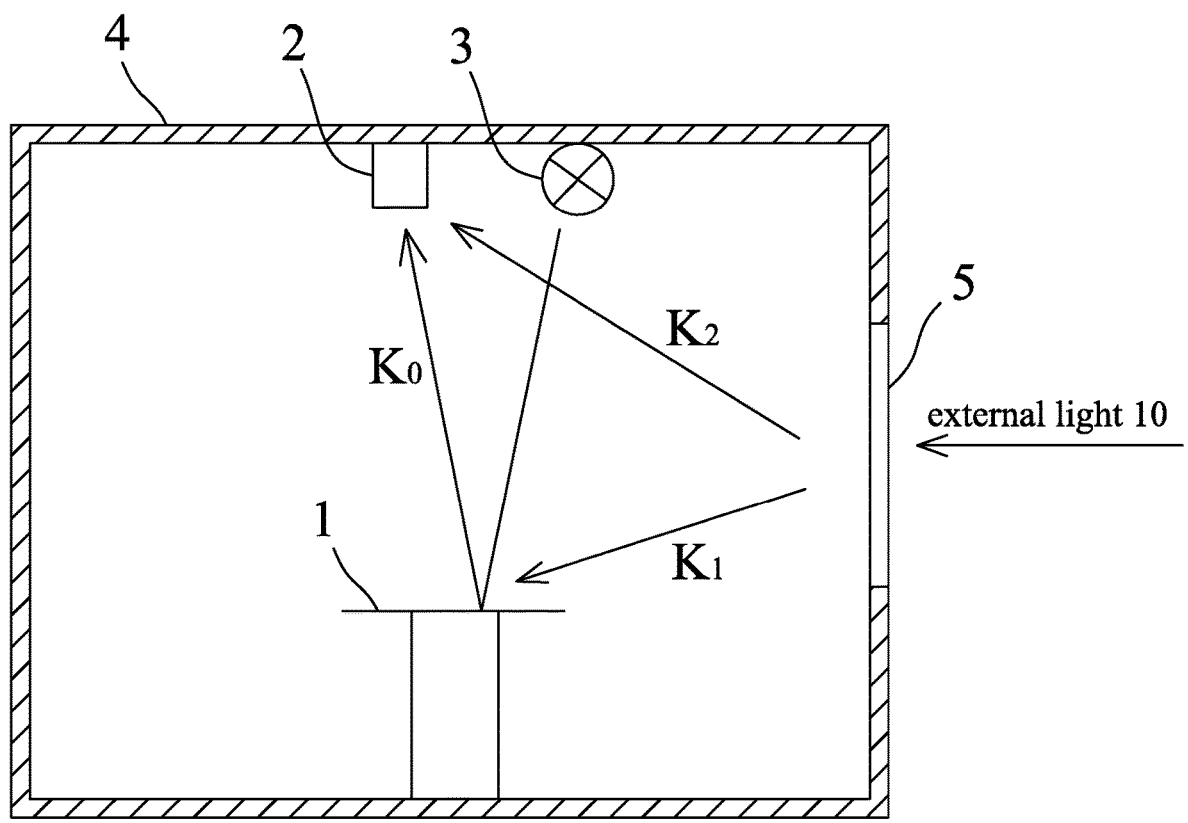
FIG. 1 is a schematic diagram of the principle of the illumination system of the present invention.

As shown in FIG. 1, the illumination system in the present embodiment comprises lamp 3, illumination sensor 2 and target area 1, where the target area 1 may be an area to be illuminated such as a table top, a work surface, a display table surface, etc., the lamp 3 can illuminate the target area 1 when it is in operation, and the illumination light of the lamp 3 to the target area 1 can be reflected by the target area 1 to the position of illumination sensor 2. Of course, the illumination of the illumination light from the lamp 3 to the target area 1 is greater than that of the illumination light reflected from the target area 1 to the position of the illumination sensor 2. The ratio of the two can be calculated.

The lamp 3, the illumination sensor 2 and the target area 1 are all located in a room 4 which is provided with a light entrance 5 such as an open door, an open window or a transparent glass, etc., through which external light passes to illuminate the position of the illumination sensor 2 and the target area 1. Of course, since the illumination sensor 2 and the target area 1 are located at different positions, the illumination of external light to the position of illumination sensor 2 and the illumination of external light to target area 1 are different. The ratio of the two can be calculated.

After the lamp is energized, the target area is illuminated, and part of the illumination light from the lamp 3 illuminating to the target area is reflected to the position of the illumination sensor through the target area. Meanwhile, the external light will enter the room through the light entrance of the room and illuminate the position of illumination sensor and target area to a certain degree. The illumination sensor can detect the illumination of light and the illumination detected by the illumination sensor is the sum of the illumination value of the light from the lamp reflected to the position of the illumination sensor through the target area and the illumination value of the external light illuminating to the position of the illumination sensor, while the illumination of the target area is the sum of the illumination value of the light from the lamp illuminating to the target area and the illumination value of the external light illuminating to the target area.

The lighting control method of this embodiment comprises the following steps:

Step 1, a plurality of time nodes are set in the illumination period of the lamp, and the plurality of time nodes divide the illumination period into a plurality of sections, and generally the length of each section is consistent;

step 2, set a first target illumination value of the illumination sensor;

step 3, adjust the brightness of the lamp until the detected value of the illumination sensor is the first target illumination value, and determine whether the illumination of the target area is appropriate at this time generally by naked eye observation;

If so, the illumination of the target area is the set illumination value at this time, and the illumination value of the external light illuminating to the position of the illumination sensor at this time is recorded, and step 4 is performed. At this time, the illumination value of the external light illuminating to the position of the illumination sensor can be calculated, and the specific calculation process will be described later;

If not, go back to step 2. After going back to step 2, set a new first target illumination value;

step 4, when each time node is reached, the system calculates the current second target illumination value of the illumination sensor, where the second target illumination value needs to make the current illumination of the target area consistent with the set illumination value of the target area;

step 5, adjust the brightness of lamps to make the detected value of the illumination sensor reach the second target illumination value. At this time, the illumination of the target area is consistent with the set illumination value of the target area.

The derivation process of the formula for calculating the second target illumination value is as follows:

Set the illumination value of the target area to T, and the detected value of the illumination sensor to P;

Then, $$T = \frac{B}{K_0} + \frac{K_1}{K_2}C, P = B + C;$$

Wherein, B is the illumination value of the light reflected from the target area to the position of the sensor, C is the illumination value of the external light illuminating to the position of the illumination sensor, $K_0$ is the illumination transfer coefficient of the target area to the position of the illumination sensor, $K_1$ is the illumination transfer coefficient of the external environment to the target area, and $K_2$ is the illumination transfer coefficient of the external environment to the position of the illumination sensor;

In this way, the set illumination value of the target area is $$T_0 = \frac{B_0}{K_0} + \frac{K_1}{K_2}C_0$$

and the detected value of the illumination sensor is $P_0 = B_0 + C_0$;

At a certain time node, the illumination value of the target area is $$T_1 = \frac{B_1}{K_0} + \frac{K_1}{K_2}C_1$$

and the detected value of the illumination sensor is $P_1 = B_1 + C_1$;

Thus, if the illumination value of the target area is equal to the set illumination value of the target area at this time node, then $T_0 = T_1$. According to the operation of the formula above, it can be obtained that $$P_1 = \left(1 - \frac{K_1 K_0}{K_2}\right)(C_1 - C_0) + P_0; C_1$$

is the illumination value of the external light illuminating to the position where the illumination sensor is located at the current time node, $C_0$ is the illumination value of the external light illuminating to the position of the illumination sensor when the detected value of the illumination sensor is the first target illumination value and $P_0$ is the first target illumination value of the illumination sensor.

wherein, $K_0$ can be calculated with the following calculation process: during the calculation, adjust the light-emitting ratio X of the lamp, and then measure the detected value P of the illumination sensor when the lamp is at each light-emitting ratio by the illumination sensor, and measure the illumination T of the target area when the lamp is at each light-emitting ratio by the illuminometer. The correspondence among X, P and T is shown in the following table:

| X | 10% | 20% | 30% | 40% | 50% | 60% | 70% | 80% | 90% | 100% |
|---|---|---|---|---|---|---|---|---|---|---|
| P | $P_a$ | $P_b$ | $P_c$ | $P_d$ | $P_e$ | $P_f$ | $P_g$ | $P_h$ | $P_i$ | $P_j$ |
| T | $T_a$ | $T_b$ | $T_c$ | $T_d$ | $T_e$ | $T_f$ | $T_g$ | $T_h$ | $T_i$ | $T_j$ |

Then perform the following operation to get the value of $K_0$:

$$K_a = \frac{P_b - P_a}{T_b - T_a}; K_b = \frac{P_c - P_b}{T_c - T_b}; K_c = \frac{P_d - P_c}{T_d - T_c}; K_d = \frac{P_e - P_d}{T_e - T_d};$$

$$K_e = \frac{P_f - P_e}{T_f - T_e}; K_f = \frac{P_g - P_f}{T_g - T_f}; K_g = \frac{P_h - P_g}{T_h - T_g}; K_h = \frac{P_i - P_h}{T_i - T_h};$$

$$K_i = \frac{P_j - P_i}{T_j - T_i}; K_0 = \frac{K_a + K_b + K_c + K_d + K_e + K_f + K_g + K_h + K_i}{9};$$

Of course, the above is just an example to illustrate the process of calculating $K_0$, in which the value and quantity of the light-emitting ratio X of the lamp can be arbitrarily selected. However, the measurement of $K_0$ is not limited to the method above. For example, $K_0$ can also be calculated by completely covering the light entrance of the room, then turning on the lamp to illuminate the target area, and detecting the illumination of the target area by the illuminometer and detecting the illumination of the lamp reflected to the position of illumination sensor through target area by illumination sensor, where the ratio of the detected value of the illuminometer to the detected value of the illumination sensor is $K_0$.

wherein, the value of $$\frac{K_1}{K_2}$$

can be calculated with the following calculation process: turn off the light, and detect the illumination of the external light illuminating to the target area by the illuminometer at each time node. At the same time, detect the illumination of the external light illuminating to the position of the illumination sensor by the illumination sensor. Thus, at each time node, the value of $$\frac{K_1}{K_2}$$

is the ratio of the detected value of the illuminometer to the detected value of the illumination sensor at the current time node.

wherein, $C_1 = P_1 - B_1$ and $C_0 = P_0 - B_0$, $P_1$ and $P_0$ are the detected values of the illumination sensor, and $B_1$ and $B_0$ can be calculated with the following calculation process: first, adjust the lamp to the brightest when the light entrance of the room is completely covered, and record the detected value of the illumination sensor at this time during which the detected value of the illumination sensor is the maximum illumination value $B_{max}$ of the light of the lamp reflected from the target area to the position of the illumination sensor. Then, $B_1 = D_1 B_{max}$ and $B_0 = D_0 B_{max}$, where $D_1$ is the duty ratio of the PWM signal of the lamp at the corresponding time node, and $D_0$ is the duty ratio of the PWM signal of the lamp when the illumination of the target area is the set illumination value.

Figure 2:
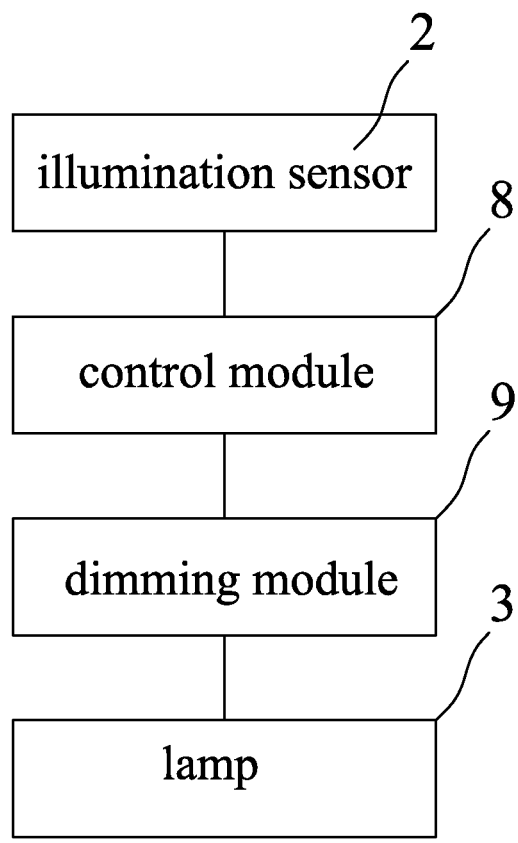
FIG. 2 is a schematic structural view of a lighting control system of the present invention.
Figure 3:
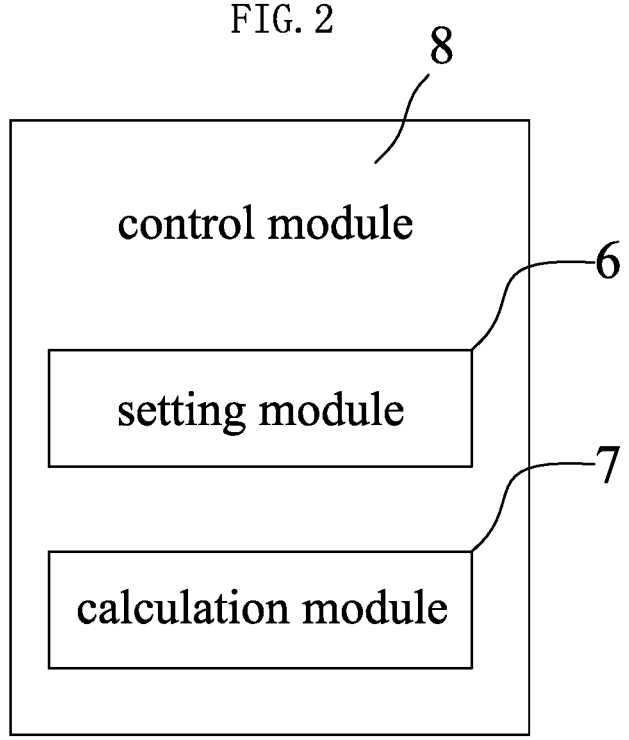
FIG. 3 is a schematic structural view of a control module.

As shown in FIG. 2 and FIG. 3, a lighting control system has also been provided in the present embodiment, comprising an illumination sensor 2, a setting module 6, a calculation module 7 and a dimming module 9.

The illumination sensor can detect the light reflected from the target area to the position of the illumination sensor and the external light 10 illuminating to the position of the illumination sensor.

The setting module is configured to set the first target illumination value of the illumination sensor.

The calculation module is configured to calculate the second target illumination value of the illumination sensor at each time node.

The dimming module is configured to adjust the brightness of the lamp according to the first target illumination value and the second target illumination value.

The setting module and the calculation module are included in the control module 8, and the dimming module is controlled by the control module to adjust the brightness of the lamp.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A lighting control method for illuminating a target area by a lamp and detecting illumination by an illumination sensor, wherein the illumination detected by the illumination sensor is a sum of an illumination value of a light from the lamp reflected to a position of the illumination sensor through a target area and the illumination value of an external light illuminating to the position of the illumination sensor, when the illumination of the target area is the sum of the illumination value of the light from the lamp illuminating to the target area and the illumination value of the external light illuminating to the target area, characterized in that the lighting control method comprises the following steps:

step 1, setting a plurality of time nodes in an illumination period of the lamp;

step 2, setting a first target illumination value of the illumination sensor;

step 3, adjusting a brightness of the lamp until a detected value of the illumination sensor is the first target illumination value, and determining whether the illumination of the target area is appropriate at this time; if yes, then the illumination of the target area is the set illumination value at this time, the illumination value of the external light illuminating to the position of the illumination sensor at this time is recorded, and step 4 is performed; if not, go back to step 2;

step 4, when each time node is reached, a current second target illumination value of the illumination sensor is calculated, and the second target illumination value needs to make the current illumination of the target area consistent with the set illumination value of the target area; and step 5, adjusting the brightness of the lamp to make the detected value of the illumination sensor reach the second target illumination value, and the illumination of the target area is consistent with the set illumination value of the target area at this time.

2. The lighting control method as claimed in claim 1, wherein the current second target illumination value of the illumination sensor is obtained by the following formula when each time node is reached:

$$P_1 = \left(1 - \frac{K_1 K_0}{K_2}\right)(C_1 - C_0) + P_0;$$

wherein, $K_0$ is the illumination transfer coefficient of the target area to the position of the illumination sensor, $K_1$ is the illumination transfer coefficient of the external environment to the target area, and $K_2$ is the illumination transfer coefficient of the external environment to the position of the illumination sensor, $C_1$ is the illumination value of the external light illuminating to the position where the illumination sensor is located at the current time node, $C_0$ is the illumination value of the external light illuminating to the position of the illumination sensor when the detected value of the illumination sensor is the first target illumination value and $P_0$ is the first target illumination value of the illumination sensor.

3. The lighting control method as claimed in claim 2, wherein $K_0$ is to be calculated by completely covering the light entrance of the room, then turning on the lamp to illuminate the target area, and detecting the illumination of the target area by the illuminometer and detecting the illumination of the lamp reflected to the position of illumination sensor through target area by illumination sensor, where the ratio of the detected value of the illuminometer to the detected value of the illumination sensor is $K_0$.

4. The lighting control method as claimed in claim 2, wherein the value of $$\frac{K_1}{K_2}$$

is to be calculated with the following calculation process: turn off the light, and detect the illumination of the external light illuminating to the target area by the illuminometer at each time node, and at the same time, detect the illumination of the external light illuminating to the position of the illumination sensor by the illumination sensor, and at each time node, the value of $$\frac{K_1}{K_2}$$

is the ratio of the detected value of the illuminometer to the detected value of the illumination sensor at the current time node.

5. The lighting control method as claimed in claim 1, wherein the plurality of time nodes divide the illumination period into a plurality of sections, and the length of each section is consistent.

6. The lighting control method as claimed in claim 1, wherein whether the illumination of the target area is appropriate at this time is determined by naked eye observation.

7. The lighting control method as claimed in claim 1, wherein in the step 3, if not, go back to step 2, and after going back to step 2, set a new first target illumination value.

* * * * *